United States Patent Office.

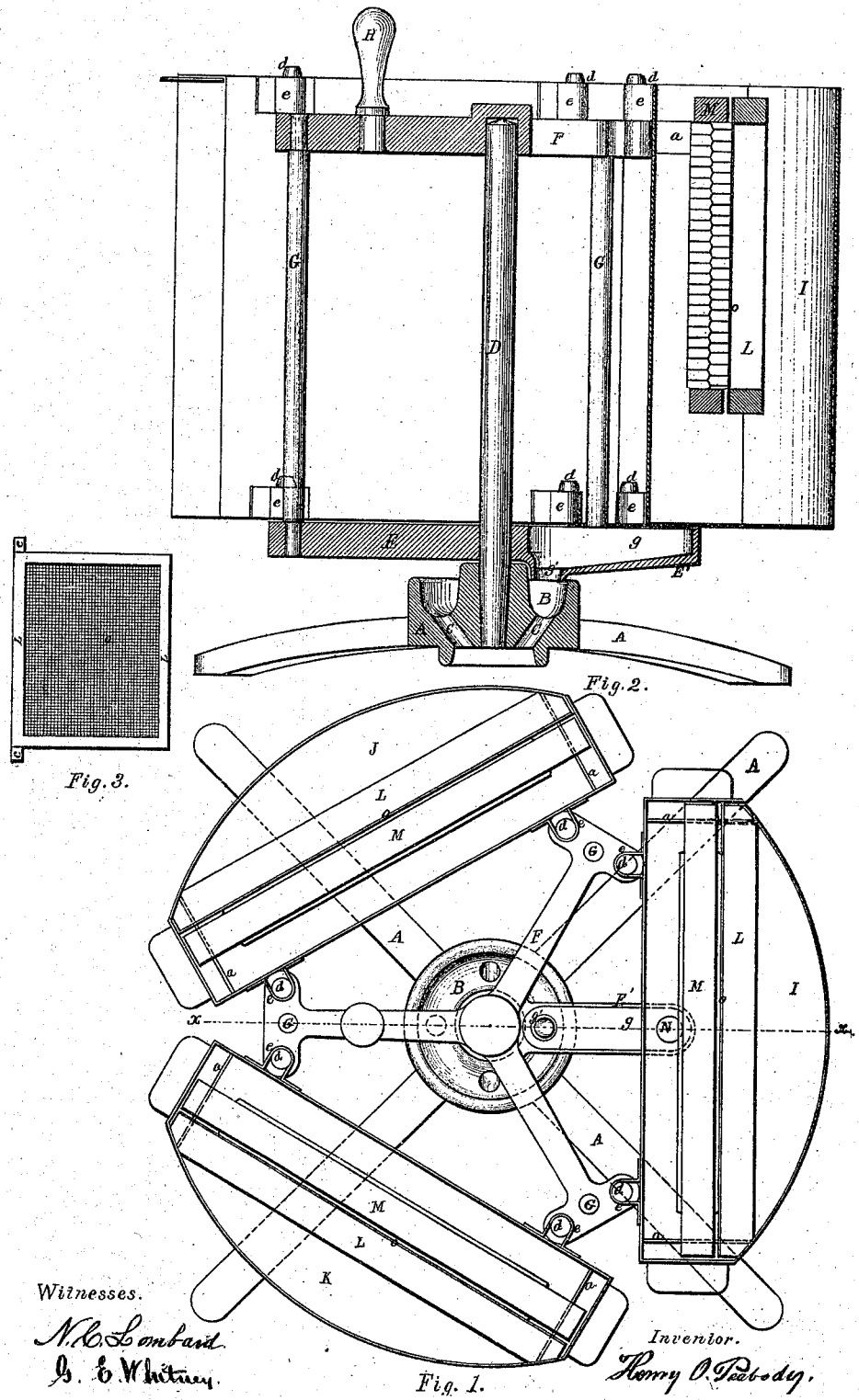

HENRY O. PEABODY, OF BOSTON, MASSACHUSETTS.

Letters Patent No. 97,684, dated December 7, 1869.

IMPROVEMENT IN CENTRIFUGAL MACHINES FOR EXTRACTING HONEY FROM THE COMB.

The Schedule referred to in these Letters Patent and making part of the same.

I, HENRY O. PEABODY, of Boston, in the county of Suffolk, and State of Massachusetts, have invented certain new and useful Improvements in "Centrifugal Machines," designed more especially for extracting honey from the comb, of which the following is a specification.

My invention relates to the construction of the revolving portion of the machine, being an improvement upon the machine for which a patent was granted to me, October 26, 1869, and numbered 96,142; and It consists in the arrangement of two or more light sheet-metal vessels around a common centre, said vessels being attached to the outer ends of the arms of two light, spider-like frames, mounted upon a central spindle, around which the whole may revolve, said vessels each being of suitable size and form to receive a wire screen and a honey-frame, and attached to the said spider-frame arms, by means of pins and sockets, in such a manner that they may be readily removed from said frames for cleaning and other purposes.

It also consists in the arrangement, in the lower spider-frame, of inclined conduits or channels, to conduct the honey from the outlets in the bottoms of the vessels to an annular groove formed in the hub of the stationary stand, which supports the spindle, on which the spider-frames and vessels revolve.

In the accompanying drawings—

Figure 1 is a plan of my improved machine.

Figure 2 is a vertical section on line $x\ x$ on fig. 1.

Figure 3 is an elevation of the wire-screen frame, drawn to a smaller scale.

A is a stand, made of cast-iron, and provided with a central hub, in the top of which is formed an annular groove, B, from which open the discharge-orifices C C.

D is a spindle, set in the hub of the stand A, upon which are mounted the spider-frames E and F, said frames being connected together by the upright rods G, and provided with a handle, H, by which they may be revolved.

I, J, and K, are vessels, made of tin, or other light sheet-metal, of the form shown, the outer wall of each being curved, so as to form a portion of a circle, common to all, and around the centre of which they revolve.

$a\ a$ are lugs or rests, upon which the honey and wire-gauze frames are supported.

L is a light frame, made of wood, of the form shown in fig. 3, upon one side of which a fine wire gauze, or thin perforated plate of sheet-metal, $o$, is secured, and provided with projections $c\ c$, by means of which it is suspended in the vessel, resting upon the lugs or rests $a\ a$, in a perfectly obvious manner.

M is a honey-frame, made of the same form, and suspended in the same manner in the vessel as the frame L, but between it and the inner wall of the vessel, with one face of the honey-comb resting against the wire screen, as shown in fig. 2.

$d\ d$ are pins or studs, set in the outer ends of the arms of the frames E and F, and projecting upward from the same.

$e\ e$ are straps of sheet-metal, soldered to the vessels I, J, and K, so as to form sockets or eyes to fit the pins $d\ d$, by means of which the said vessels may be attached to the frames E and F, so that they will revolve with them, and, at the same time, they may be readily removed therefrom, when desired, for cleaning or any other purpose.

N is an outlet in the bottom of the vessel I, (not shown in J and K,) from which the honey will be discharged into the inclined conduit $g$, formed in arm E' of the frame E, down which it will flow when the revolution of the machine is stopped, and, falling through the outlet $g'$ into the annular groove B, will be discharged, through the orifices C C, into a receptacle placed beneath the stand A for that purpose, said stand being made of sufficient height to allow of this being done.

The operation of my machine is as follows:

The wire screens L are placed in position in the several vessels, as shown, with the wire gauze or perforated plate toward the centre of the machine, and the frames containing the honey-comb are placed in the vessels, with one face of the comb resting against the wire gauze, the caps of the cells having been first removed, when the machine is set in motion, by means of the handle H, when the honey in the cells, on that side next to the wire gauze, will be forced from the cells, by its tendency to fly off at a tangent, and, passing through the wire gauze, be deposited upon the outer wall of the vessel.

When the honey has all been discharged from one side of the comb, the honey-frames M are removed from the vessels and turned around, and replaced in the vessels, with the other face of the comb against the wire screen, and the machine is again set in motion, as before.

When the motion of the machine is stopped, the honey will flow through the outlet N in the bottom of the vessel, into and down the inclined conduit $g$, through the outlet $g'$, into the annular groove B, and through the orifices C C, into a vessel placed under the stand A to receive it.

The outlet N in the bottom of the vessel, the inclined conduit $g$, the annular groove B, and discharge-orifices C C, may be dispensed with, as shown, in the case of the vessels J and K, and the vessels may be removed from the revolving frame, to discharge the honey from the same, the honey-frames and wire screens being first removed therefrom.

These machines may be constructed to carry any desired number of vessels, each provided with a wire screen, and may receive a honey-frame, or not, as desired, care being taken to distribute the load evenly around the centre, so as to balance the machine when the vessels are not all full.

What I claim as new, and desire to secure by Letters Patent, is—

1. The use, in centrifugal machines, of two or more light portable vessels, arranged around a common centre, and attached to the arms of a light frame, in such a manner that either or all of them may be removed therefrom, when desired, said frame being mounted upon a central spindle, around which the whole may revolve, and each of the said vessels being adapted to receive a wire screen, and the material to be acted upon, substantially as described.

2. In combination with two or more vessels, arranged as described, the outlet N, inclined conduit $g$, outlet $g'$, annular groove B, and discharge-orifices C C, substantially as described.

Executed at Boston, this 5th day of November, 1869.

HENRY O. PEABODY.

Witnesses:
N. C. LOMBARD,
G. E. WHITNEY.